Patented Sept. 5, 1950

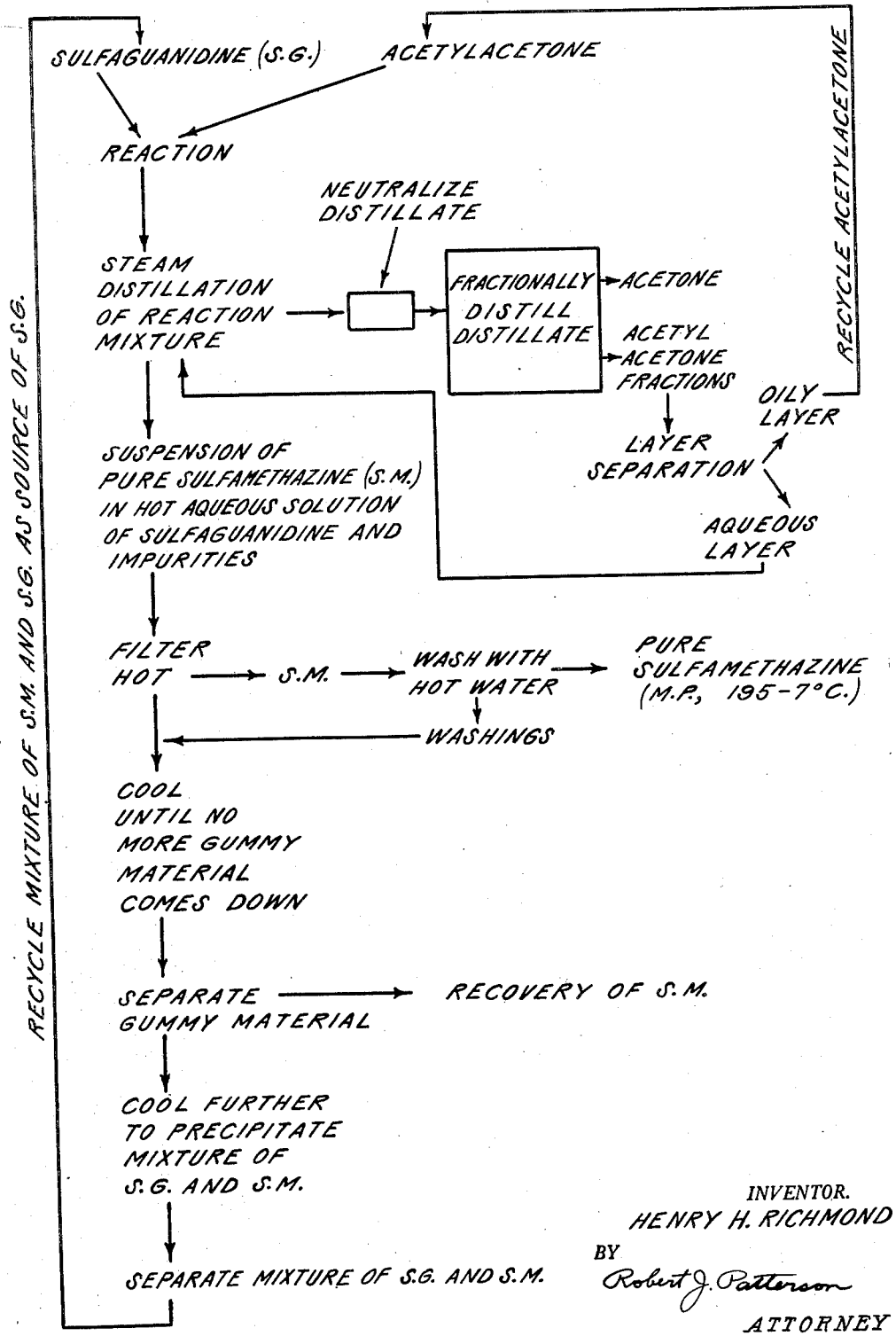

2,521,097

UNITED STATES PATENT OFFICE 2,521,097

PURIFICATION OF SULFAMETHAZINE

Henry H. Richmond, Guelph, Ontario, Canada, assignor to United States Rubber Company, New York, N. Y., a corporation of New Jersey Application July 15, 1948, Serial No. 38,842

8 Claims. (Cl. 260—239.75)

This invention relates to improvements in the manufacture of sulfamethazine. It relates particularly to a simple and inexpensive method of recovering unreacted sulfaguanidine from the reaction products obtained by the condensation of sulfaguanidine with acetylacetone to make sulfamethazine. It relates particularly to such a method wherein the sulfaguanidine is separated from substantially pure sulfamethazine, whereby there is effected in a single process separate recovery of substantially pure sulfamethazine and of unreacted sulfaguanidine from the reaction mixture obtained by condensing sulfaguanidine with acetylacetone. Another object is to provide a process of the foregoing type wherein unreacted acetylacetone is recovered in a simple and economical manner from the reaction mixture in such a form that it is adapted to re-use in the process. Many other aims and objects of the present invention will be apparent to those skilled in the art from the following description.

Sulfamethazine has heretofore been made by the condensation of acetylsulfanilyl chloride with 2-amino-4,6-dimethylpyrimidine. However the process presents a number of disadvantages. It has also been proposed to make sulfamethazine by the condensation of sulfaguanidine with acetylacetone. This process also has presented various disadvantages although in many respects it is more attractive commercially than the synthesis just mentioned. The principal disadvantage of the sulfaguanidine route is the fact that there has heretofore been no simple and inexpensive method of recovering the unreacted reactants, particularly the unreacted sulfaguanidine, from the reaction mixture. Since sulfaguanidine is an expensive chemical, and since the reaction mixture contains considerable quantities of unreacted sulfaguanidine, the amount thereof often ranging as high as 20 to 30% of the original sulfaguanidine taken, the previous inability to recover this unreacted sulfaguanidine in a commercially feasible manner has contributed to the high cost of making sulfamethazine by the condensation of sulfaguanidine with acetylacetone and has hindered commercial utilization of this synthesis.

In my copending application, Serial No. 38,841, filed of even date herewith, I have disclosed and claimed a commercial feasible method of recovering the unreacted sulfaguanidine in the mixture of sulfaguanidine and sulfamethazine and impurities obtained by the condensation of sulfaguanidine with acetylacetone. The said method comprises heating the mixture of sulfaguanidine and sulfamethazine and impurities with dilute aqueous ammonium hydroxide to effect solution of the sulfaguanidine and the sulfamethazine, followed by cooling to effect precipitation of the sulfaguanidine. The precipitated sulfaguanidine is separated from the resulting solution which is treated to effect recovery of the sulfamethazine contained therein. By using this procedure almost all of the sulfaguanidine present in the reaction mixture can be recovered.

While the process described in the said copending application has many advantages over the prior art, the quality of the sulfamethazine obtained thereby, while satisfactory for most purposes, is not as high as is sometimes desired, particularly where sulfamethazine for human consumption is desired. Furthermore, the said process involves a consumption of chemicals namely sulfuric acid or the like, decolorizing carbon and ammonia and involves a considerable number of steps. The process of the present invention has the advantages of simplicity, fewer steps being required, no chemicals are needed in the purification, a higher yield is obtained, both the unreacted sulfaguanidine and the unreacted acetylacetone are recovered for re-use in the process, and the sulfamethazine produced is of high quality being perfectly white in color, whereas the sulfamethazine produced by the process of my copending application may have a slightly yellow tint; furthermore the sulfamethazine produced by the present invention has a melting point some 2 to 3 degrees higher than that produced by the process of my copending application.

The accompanying drawing, which will be self-explanatory in the light of the following description, portrays diagrammatically a typical method of making sulfamethazine in accordance with the process of the present invention.

I have now discovered that unreacted sulfaguanidine may be recovered in an improved manner from a mixture of sulfaguanidine and sulfamethazine and impurities of unknown nature obtained by the condensation of sulfaguanidine with acetylacetone by heating the mixture of sulfaguanidine and sulfamethazine and impurities with water to a temperature of at least 50° C. and thereby effecting solution in the water of substantially all of the sulfaguanidine and the impurities while leaving most of the sulfamethazine in undissolved substantially pure form, and separating the undissolved sulfamethazine from the resulting solution at a temperature of at least 50° C.

A typical method of carrying out the process of my invention comprises adding sufficient water to the crude reaction product and warming to at least 50° C., and preferably to a temperature ranging from 90° C. to the boiling point, to effect solution of all of the sulfaguanidine. Under such conditions I have unexpectedly found that the major portion (usually at least 90% by weight thereof) of the sulfamethazine remains undissolved in substantially pure form and can be separated by filtering the hot resulting suspension in such manner that the solution is not permitted to cool appreciably, for example, by means of a steamheated Büchner funnel. The substantially pure form of the sulfamethazine thus obtained is to be emphasized since it is a major advantage of the present invention. The filtrate on cooling deposits a mixture of sulfaguanidine, sulfamethazine and impurities. The composition of the deposited mixture often is about 70% sulfaguanidine, 20% sulfamethazine and 10% gummy impurities. The weight of this mixture may be approximately one-third that of the sulfamethazine that is filtered off. This crude mixture of sulfaguanidine and sulfamethazine need not be treated to effect resolution into sulfaguanidine and sulfamethazine but can be used directly in place of an equivalent quantity of sulfaguanidine in a subsequent condensation with acetylacetone to make sulfamethazine. However the impurities tend to accumulate.

I have discovered that these impurities may be prevented from accumulating in the sulfaguanidine-sulfamethazine mixture in the following manner. I have found that upon cooling the filtrate the gummy impurities precipitate out first. I prefer to warm the filtrate until no undissolved material is present before cooling it to precipitate the gum. By waiting until no more of the gum precipitates, separating the solution from the gum by decantation and allowing the separated solution to stand further, there is precipitated a crystalline mixture of sulfaguanidine and sulfamethazine of good quality which is preferably recycled to the reaction step as a source of sulfaguanidine therefor. On cooling the filtrate gum separates even after room temperature is reached. The criterion for the time of decantation is not the temperature but the point, ascertained by close observation, when the gum ceases deposition and the first traces of crystalline material are in evidence. The mixture is usually cooled to room temperature only. This part of my process is preferably so conducted that substantially all of the gummy impurities present and substantially none or not more than a minor proportion of the sulfaguanidine and sulfamethazine is precipitated from the filtrate. In this way loss of sulfaguanidine and sulfamethazine with the gummy impurities is minimized. This gummy material need not be discarded since sulfamethazine can be obtained therefrom by crytalization from alcohol or by other means.

The first large crop of sulfamethazine obtained by the hot filtration step described above is quite pure but is preferably washed with water as hot as can conveniently be obtained and used, preferably with water at a temperature of from 90° to 100° C. In this way removal of impurities is effected and the sulfamethazine that is obtained is of excellent quality, being perfectly white in color. The wash water is mixed with the initial filtrate whereby any sulfaguanidine and sulfamethazine therein is saved.

The temperature to which the reaction mixture is heated with water in the first step of my process may vary widely but should be as high as possible, preferably at least 90° C. The higher the temperature, the smaller the volume of water required to dissolve the sulfaguanidine and impurities. Furthermore the smaller the quantity of water used the less sulfaguanidine and sulfamethazine will remain dissolved in the mother liquors when the mixture of sulfaguanidine and sulfamethazine (for recycle) is filtered off. At temperatures below 50° C., the solubility of sulfaguanidine in water is so small that the large volumes of water required to effect solution thereof would make unattractive the use of such low temperatures in the first step of my process.

The temperature maintained during the hot filtration step employed to separate the pure sulfamethazine is generally substantially the same as that employed in the dissolving step.

Since acetylacetone is a costly raw material an attempt was made to recover any of it that was present in unreacted form from the reaction mixture. It was estimated that there must be a considerable quantity of it unreacted, knowing that from 20 to 30% of the sulfaguanidine originally taken often was unchanged in the reaction. At first I attempted to effect recovery of the acetylacetone by distillation of the reaction mixture under reduced pressure to remove the volatile material present. The distillate was fractionated to give about 3% of the initial quantity of acetylacetone used. The recovery by this process was low. Another disadvantage of this method of recovery lay in the fact that the distillation residue solidified making it difficult for the mass to be removed or handled. However I discovered an economical and expedient method for the recovery of the unreacted acetylacetone in good yield for re-use in the process thereby effecting a considerable economy in the manufacture of sulfamethazine.

My improved recovery method comprises the steam distillation of the reaction mixture and the fractional distillation of the steam distillate. In accordance with the preferred practice of my invention the steam distillation and the separation of the sulfamethazine from the sulfaguanidine and impurities by solution of the latter in hot water are carried out at the same time, the steam that condenses in the distilling vessel providing at least a part and preferably all of the hot water that is used for making the separation.

Acetylacetone is only soluble to the extent of 16% in water at room temperature. I have found that acetylacetone forms an azeotrope with water. So far as I am aware the existence of this azeotrope was previously unknown. I have found that the acetylacetone may be recovered in good yields by fractionally distilling the steam distillate and separating the fraction or fractions rich in acetylacetone into an acetylacetone layer or layers and an aqueous layer or layers by condensing such fraction or fractions and allowing the condensate to undergo layer formation. The fractionation also yields a fraction or fractions rich in acetone which can be discarded or used as a source of acetone. The acetylacetone layer or layers may be very advantageously recycled to the reaction step as a source of acetylacetone. I prefer to recycle the water layer or layers by admixing such layer or layers with the reaction mixture and steam-distilling the resulting mixture in a subsequent operation of the process of my invention, thereby conserving the acetylacetone content of the aqueous layer or layers.

Since the reaction mixture also contains acetic acid, I find it desirable to neutralize the steam distillate prior to the fractional distillation thereof in order to fix the acetic acid, thereby avoiding any corrosion problem where an iron fractionating column is used to fractionally distill the neutralized distillate. The neutralization of the acetic acid also serves the purpose of assisting the fractionation because in this way there is no difficulty experienced in separating the acetic acid from the acetylacetone and the acetone.

Apparently acetone and acetic acid are present in the reaction mixture as the result of hydrolysis of acetylacetone during the reaction with sulfaguanidine.

A curve of the refractive indices of aqueous acetylacetone solutions of various concentrations may be made and employed to indicate when little or no more acetylacetone is coming over in the steam distillate. If desirable, although usually not preferred, the aqueous layer or layers containing acetylacetone may be again fractionated. The necessity for such a second fractionation is avoided by admixing the aqueous layer or layers with the next reaction mixture before the steam distillation.

The following examples illustrate my invention in more detail.

*Example 1*

In a one litre, 3-necked flask equipped with a stirrer, a thermometer and a condenser there was placed 400 g. of sulfaguanidine hydrate and 190 cc. of acetylacetone. The mixture was refluxed with stirring, being heated with an oil bath kept at 140° C. for 19 hours. The internal liquid temperature was 97–105°.

The reaction mixture was steam distilled and the hot aqueous suspension, having a volume of 700 cc., was filtered through a steam-heated Büchner funnel and the solid cake of sulfamethazine was washed with 1000 cc. of boiling water. The sulfamethazine weighed 310 g., M. P. 195–7°. On cooling the filtrate deposited a mixture of sulfaguanidine and sulfamethazine weighing 127 g., M. P. 150°. This represents a recovery of 32%. The yield based on this recovery is 95%.

*Example 2*

In a one litre, three-necked flask equipped with a stirrer, a thermometer and a condenser there was placed 127 g. of the sulfaguanidine-sulfamethazine mixture recovered in the preceding example, 283 g. of sulfaguanidine hydrate and 190 cc. of acetylacetone. The mixture was refluxed with stirring for 20 hours, being heated with an oil bath kept at 140° C. The internal liquid temperature was 97–105°. The reaction mixture was steam distilled and the hot aqueous suspension was filtered through a steam heated Büchner, the cake of sulfamethazine being washed with a litre of boiling water. In this way, 317 g. of sulfamethazine M. P. 195–6° was obtained. The filtrate was warmed to solution and allowed to cool to a point where no more gummy material precipitated (64 g.); it was then decanted and allowed to stand at room temperature to precipitate a crystalline mixture of sulfaguanidine and sulfamethazine weighing 122 g. The yield of sulfamethazine therefore was 91.5%. The gummy material (64 g.) was crystallized from alcohol to yield sulfamethazine.

The steam distillate of 590 cc. was taken off in a number of fractions until the refractive index became constant at $n_D^{20}=1.3338$ indicating that no more acetylacetone came over. The steam distillate had a pH of 3 showing that there was considerable acetic acid present. This steam distillate was neutralized with sodium bicarbonate and fractionated at atmospheric pressure.

The fractions were (1) 56–60°, wt. 2.9 g., $n_D^{20}=1.3658$, containing acetone (2) 60–80°, wt. 2.3 g., $n_D^{20}=1.3878$, (3) 80–82°, wt. 8.2 g., $n_D^{20}=1.4195$, (4) 82–98°, two layers consisting of 6.5 g. oil and 22.6 g. of an aqueous phase $n_D^{20}=1.3518$, (5) 98°, wt.=42.6 g. $n_D^{20}=1.3425$, (6) 98°, wt.=42.1 g. $n_D^{20}=1.3392$, (7) 98°, wt.=42.7 g., $n_D^{20}=1.3380$, (8) 98–100°, wt.=21.2 g., $n_D^{20}=1.3330$, (9) 98–100°, wt.=9.0 g. $n_D^{20}=1.3330$.

Fractions (1) and (2) contained mostly acetone; the oil of fraction (4) was separated and the aqueous phases of fractions (3) to (7) were gathered together whose total volume was 158 cc. All subsequent fractions were discarded since their refractive indices indicated no acetylacetone present.

This aqueous solution on refractionation gave the following fractions: (1) 56–95°, wt. 6.9 g. $n_D^{20}=1.3869$ containing acetone; (2) 98° two layers consisting of 7.5 g. of oil and 11.0 g. of an aqueous phase $n_D^{20}=1.3520$; (3) 98°, wt. 18.9 g. $n_D^{20}=1.3379$; (4) 98°, wt. 17.0 g. $n_D^{20}=1.3387$; (5) 98°, wt. 8.4 g. $n_D^{20}=1.3338$ g.; (6) 98–100°, wt. 7.3 g. $n_D^{20}=1.3330$.

Fraction (1) contained mostly acetone; the oil of fraction (2) was separated and the aqueous phases of fractions (2) to (5) were gathered together whose total volume was 54 cc. $n_D^{20}=1.3382$ which is the refractive index of a 5% solution of acetylacetone.

The total oil (acetylacetone) recovered was 12.9 g., $n_D^{20}=1.4480$ and the acetylacetone present in the 5% solution was 2.7 g. Hence the total acetylacetone recovered was 15.6 g. or 8.5%. Total acetone recovered is 12.1 g.

In order to analyse the solutions of acetylacetone obtained, a graph was constructed of the $n_D^{20}$ of solutions of acetylacetone of varying strength. The data used was the following:

| Per cent acetylacetone | $n_D^{20}$ |
|---|---|
| 0 | 1.3330 |
| 1.46 | 1.3346 |
| 3.90 | 1.3372 |
| 6.96 | 1.3403 |
| 9.73 | 1.3435 |
| 13.01 | 1.3473 |
| 14.81 | 1.3494 |

*Example 3*

In a one litre three-necked flask equipped with a stirrer, a reflux condenser and a thermometer, there was added 400 g. of sulfaguanidine hydrate (1.72 moles) and 190 cc. of commercial grade acetylacetone is specified as containing above 90% acetylacetone. The mixture was refluxed with stirring, being heated with an oil bath kept at 140° for 19 hours. The internal liquid temperature was 97–105°. Throughout the first half of the reaction period the mixture was in solution but subsequently a solid precipitated.

The reaction mixture was steam distilled until 880 cc. of steam distillate was accumulated. The remaining suspension whose volume was about a litre and which was close to the boiling temperature was filtered through a steam jacketed Büchner and washed with 200 cc. of boiling water. The crystalline white sulfamethazine that was filtered off weighed 322 g. M. P. 196°. The filtrate on cooling deposited a yellowish crop of crystals which was a mixture of sulfamethazine and sulfaguanidine weighing 118.3 g. M. P. 140–145° C. The aqueous mother liquor whose volume was 1170 cc. was evaporated to dryness yielding a gummy solid weighing 20 g.

The mixture was dissolved with heating in a litre of an ammonia solution containing 75 cc. of 28% ammonia. On cooling a crop of 82 g. of sulfaguanidine was filtered off, M. P. 180°. The filtrate was acidified with stirring and partially neutralized with ammonia to pH 1.8 to precipitate 3 grams of tar. The filtrate after removal of tar was neutralized with ammonia to precipitate 29.8 g. of a poor quality crude sulfamethazine, M. P. 125° which on crystallization from alcohol yielded 18 g. of sulfamethazine, M. P. 196°. Hence total tarry material weighed 14.8 g.

The steam distillate was analyzed for acetylacetone by condensation of a 10 cc. aliquot with o-phenylenediamine. (Thiele et al., Berichte 40, 455 (1907)). The weight of black precipitate was 1.72 g. indicating that there was 12.5 g. of acetylacetone in the steam distillate, a recovery of 6.8%.

The recovery of sulfaguanidine was 20% and the yield of sulfamethazine was 340 g. which is 89% based on the sulfaguanidine not recovered. The yield of sulfamethazine is 95% on the basis that the crude mixture of 118.3 g. of sulfaguanidine-sulfamethazine recovered, is considered to be sulfaguanidine.

From the foregoing description it will be seen that the present invention provides an extremely simple method of effecting production of pure sulfamethazine and the recovery of the unreacted sulfaguanidine and acetylacetone from the reaction mixture produced by the condensation of sulfaguanidine with acetylacetone. It was surprising and wholly unexpected that all of the impurities in such a reaction mixture would be water-soluble so that by simply filtering the hot suspension and washing the separated sulfamethazine with hot water, pure sulfamethazine requiring no further purification is obtained in good yields. In fact it was expected that water-insoluble impurities would be present. It was also surprising that no sulfaguanidine appeared in the sulfamethazine filter cake. The yield of recovered sulfamethazine brought about by the process of the present invention is about 10% better than the yield obtained with the ammonium hydroxide process described in my copending application mentioned above. The quality of sulfamethazine is also substantially better than that of the ammonium hydroxide process. Furthermore the discovery that the mixture of sulfaguanidine and sulfamethazine obtained on cooling the filtrate can be recycled to the reaction as a source of sulfaguanidine, particularly if the gummy impurities are separated therefrom by the stepwise precipitation method described above, is highly advantageous in reducing the cost of manufacture of sulfamethazine.

Another advantage of my process is that no chemicals except water are required for the isolation of sulfamethazine and the separation of sulfaguanidine with resultant economy. The number of process steps required to isolate pure sulfamethazine is brought to a minimum since the pure sulfamethazine is filtered off directly. The productivity of the process is very high compared to the ammonium hydroxide process of my copending application. In addition the process described herein provides a very advantageous method of separating and recovering unreacted acetylacetone, and a simple method of preventing acetone and acetic acid, which were found to be present in the reaction mixture and to come over with the distillate by ordinary distillation, from contaminating the acetylacetone. The method makes use of the acetylacetone contained in the aqueous condensate layers. The method combines the steam distillation with the separation of the sulfamethazine in a highly advantageous manner since the steam distillation affords a source of almost boiling water. Many other advantages of the process of my invention will be obvious to those skilled in the art.

Having thus described my invention, what I claim and desire to protect by Letters Patent is:

1. A process of recovering substantially pure sulfamethazine from the reaction mixture obtained by the condensation of sulfaguanidine with acetylacetone, said reaction mixture containing product sulfamethazine, unreacted sulfaguanidine and water-soluble impurities, which comprises heating said reaction mixture with water to a temperature of at least 50° C. and thereby effecting solution in the water of substantially all of the sulfaguanidine and impurities while leaving sulfamethazine in undissolved substantially pure form, and separating said undissolved sulfamethazine from the resulting solution at a temperature of at least 50° C.

2. A process of recovering substantially pure sulfamethazine from the reaction mixture obtained by the condensation of sulfaguanidine with acetylacetone, said reaction mixture containing product sulfamethazine, unreacted sulfaguanidine and water-soluble impurities, which comprises heating said reaction mixture with water to a temperature of at least 90° C. and thereby effecting solution in the water of substantially all of the sulfaguanidine and impurities while leaving sulfamethazine in undissolved substantially pure form, and separating said undissolved sulfamethazine from the resulting solution at a temperature of at least 90° C.

3. A process of recovering substantially pure sulfamethazine from the reaction mixture obtained by the condensation of sulfaguanidine with acetylacetone, said reaction mixture containing product sulfamethazine, unreacted sulfaguanidine and water-soluble impurities, which comprises heating said reaction mixture with water to a temperature of at least 90° C. and thereby effecting solution in the water of substantially all of the sulfaguanidine and impurities while leaving sulfamethazine in undissolved substantially pure form, separating said undissolved sulfamethazine from the resulting solution at a temperature of at least 90° C., and washing the separated undisolved sulfamethazine with water at a temperature of from 90° C. to 100° C.

4. A process of recovering substantially pure sulfamethazine from the reaction mixture obtained by the condensation of sulfaguanidine with acetylacetone, said reaction mixture containing product sulfamethazine, unreacted sulfaguanidine and water-soluble impurities, which comprises heating said reaction mixture with water to a temperature of at least 50° C. and thereby effecting solution in the water of substantially all of the sulfaguanidine and the impurities while leaving sulfamethazine in undissolved substantially pure form, separating said undissolved sulfamethazine from the resulting solution at a temperature of at least 50° C., cooling the resulting solution to effect precipitation of a mixture of sulfaguanidine and sulfamethazine, and separating the precipitated mixture of sulfaguanidine and sulfamethazine from the mother liquor.

5. A process of recovering substantially pure sulfamethazine from the reaction mixture obtained by the condensation of sulfaguanidine with acetylacetone, said reaction mixture containing product sulfamethazine, unreacted sulfaguanidine and water-soluble impurities, which comprises heating said reaction mixture with water to a temperature of at least 90° C. and thereby effecting solution in the water of substantially all of the sulfaguanidine and the impurities while leaving sulfamethazine in undissolved substantially pure form, separating said undissolved sulfamethazine from the resulting solution at a temperature of at least 90° C., cooling the resulting solution to effect precipitation of a mixture of sulfaguanidine and sulfamethazine, and separating the precipitated mixture of sulfaguanidine and sulfamethazine from the mother liquor.

6. A process of recovering substantially pure sulfamethazine from the reaction mixture obtained by the condensation of sulfaguanidine with acetylacetone, said reaction mixture containing product sulfamethazine, unreacted sulfaguanidine and water-soluble impurities which comprises heating said reaction mixture with water to a temperature of at least 50° C. and thereby effecting solution in the water of substantially all of the sulfaguanidine and the impurities while leaving sulfamethazine in undissolved sulfamethazine from the resulting solution at a temperature of at least 50° C., warming the mixture from which said sulfamethazine has been separated until no undissolved material is present, cooling the resulting solution to a point at which substantially all gummy impurities but not more than a minor proportion of dissolved sulfaguanidine and sulfamethazine have been precipitated, separating the precipitated gummy impurities from the resulting solution, allowing the resulting solution to stand to effect precipitation of a mixture of sulfaguanidine and sulfamethazine, and separating the precipitated mixture of sulfaguanidine and sulfamethazine from the mother liquor.

7. A process of recovering substantially pure sulfamethazine from the reaction mixture obtained by the condensation of sulfaguanidine with acetylacetone, said reaction mixture containing product sulfamethazine, unreacted sulfaguanidine and water-soluble impurities which comprises heating said reaction mixture with water to a temperature of at least 90° C. and thereby effecting solution in the water of substantially all of the sulfaguanidine and the impurities while leaving sulfamethazine in undissolved substantially pure form, separating said undissolved sulfamethazine from the resulting solution at a temperature of at least 90° C., warming the mixture from which said sulfamethazine has been separated until no undissolved material is present, cooling the resulting solution to a point at which substantially all gummy impurities but not more than a minor proportion of dissolved sulfaguanidine and sulfamethazine have been precipitated, separating the precipitated gummy impurities from the resulting solution, allowing the resulting solution to stand to effect precipitation of a mixture of sulfaguanidine and sulfamethazine, and separating the precipitated mixture of sulfaguanidine and sulfamethazine from the mother liquor.

8. A process of recovering substantially pure sulfamethazine, unreacted sulfaguanidine, and unreacted acetylacetone from the reaction mixture obtained by the condensation of sulfaguanidine with acetylacetone, said reaction mixture containing product sulfamethazine, unreacted sulfaguanidine, unreacted acetylacetone and water-soluble impurities, which comprises steam-distilling said reaction mixture and thereby removing unreacted acetylacetone therefrom and effecting solution in water at a temperature of at least 90° C. of substantially all of the sulfaguanidine and the impurities while leaving sulfamethazine in undissolved substantially pure form, said water being obtained by condensation of steam used in said steam-distilling step, separating said undissolved sulfamethazine from the resulting solution at a temperature of at least 90° C., cooling the resulting solution to effect precipitation of substantially all gummy impurities present but not more than a minor proportion of dissolved sulfaguanidine and sulfamethazine, separating said precipitated gummy impurities from the resulting solution, allowing the resulting solution to stand to effect precipitation of a mixture of sulfaguanidine and sulfamethazine, and separating the precipitated mixture of sulfaguanidine and sulfamethazine from the mother liquor.

HENRY H. RICHMOND.

REFERENCES CITED

The following references are of record in the file of this patent:

UNITED STATES PATENTS

| Number | Name | Date |
| --- | --- | --- |
| 2,224,836 | Roblin et al. | Dec. 10, 1940 |
| 2,371,115 | Winnek et al. | Mar. 6, 1945 |
| 2,392,125 | Dhein | Jan. 1, 1946 |
| 2,410,793 | Winnek et al. | Nov. 5, 1946 |
| 2,417,939 | Kuh et al. | Mar. 25, 1947 |
| 2,430,439 | Winnek et al. | Nov. 4, 1947 |
| 2,435,002 | Hartmann et al. | Jan. 27, 1948 |